United States Patent [19]

Formo

[11] Patent Number: 4,620,488

[45] Date of Patent: Nov. 4, 1986

[54] SERVING TRAY

[75] Inventor: Jerome L. Formo, St. Paul, Minn.

[73] Assignee: O Tray Corporation, Oklahoma City, Okla.

[21] Appl. No.: 758,364

[22] Filed: Jul. 24, 1985

[51] Int. Cl.⁴ ............................................. B65D 1/34
[52] U.S. Cl. .................................... 108/46; 108/137; 206/557
[58] Field of Search .................................. D3/37–40; 108/44, 47, 152; 206/557, 562, 563; 220/85 H; 428/99

[56] References Cited

U.S. PATENT DOCUMENTS

| | | |
|---|---|---|
| D. 41,394 | 9/1911 | Flitcraft . |
| D. 186,181 | 7/1959 | Silkenat . |
| D. 192,465 | 1/1962 | Brady et al. . |
| D. 204,998 | 12/1966 | Klein . |
| D. 204,999 | 8/1966 | Edwards . |
| D. 237,020 | 3/1975 | Valentine . |
| D. 257,296 | 10/1980 | White . |
| D. 261,971 | 7/1981 | Wokeck . |
| D. 270,785 | 4/1983 | White . |
| 1,534,095 | 4/1925 | Walker ............................... 108/46 X |
| 1,593,834 | 7/1926 | McNeal et al. ...................... 108/47 |
| 1,788,800 | 1/1931 | McGinley ......................... 108/46 X |
| 2,049,386 | 7/1936 | Temperli ............................. 108/11 |
| 2,979,225 | 4/1961 | Noffsinger ........................ 220/85 H |

Primary Examiner—Henry F. Epstein

Attorney, Agent, or Firm—Peterson, Wicks, Nemer & Kamrath

[57] ABSTRACT

An improved serving tray according to the teachings of the present invention is disclosed as including a window abutting element which is laterally positionable allowing a window abutting edge to abut with and fulcrum on the outside surface of the window to compensate for variations of the angle of the window to allow the serving platform of the serving tray to be horizontal. The window abutting element is laterally positionable by slideably mounting it to the bottom surface of the serving platform. In its most preferred form, the window abutting element is slideably mounted by arms extending generally parallel to and spaced from the rear legs of the serving tray. The window abutting element is held in one of multiple positions by teeth formed on the bottom surface of the serving platform and formed on the window abutting element. The window abutting element is biased towards the serving platform and is allowed to be moved away from the serving platform to separate the teeth of the window abutting element from the teeth of the serving platform. In its most preferred form, the window abutting element includes a tongue formed integrally therewith and slideable along a connector extending between the arms and the rear legs to bias the window abutting element towards the serving platform and to allow separation of the teeth.

20 Claims, 4 Drawing Figures

SERVING TRAY

BACKGROUND

The present invention relates generally to serving trays and specifically to improvements to serving trays allowing the tray to be horizontal when removably attached to automobile windows.

The serving trays depicted in U.S. Design Pat. No. 270,785 are the first major design improvement in such serving trays since their inception and are advantageous over prior serving trays. Specifically, this serving tray is removably secured to the window of the automobile and requires no braces, arms, or the like extending between the serving platform and body portions of the automobile. Further, this tray is aesthetically pleasing while being of a very functional design. Additionally, this tray is very lightweight and can be easily stacked and nested together. Similarly, this tray can be easily and rapidly removably secured to an automobile window while both hands of the carhop are holding the sides of the tray. Likewise, the tray is of a simple design which can be economically manufactured.

However, problems have arisen in the ability of this tray to hold the serving platform horizontal for all makes and types of automobile varieties. Specifically, the windows of automobiles of different models and years extend at different angles from the car body. Since this tray is removably secured to the window, the large range of window angles has resulted in a need for an improvement to this tray design to allow the tray to be horizontal when removably attached to automobile windows of different automobile models and varieties.

SUMMARY

The present invention solves this need and other problems encountered in serving trays by providing in its most preferred form an improved serving tray having a window abutting element which is laterally positionable allowing a window abutting edge to abut with and fulcrum on the outside surface of the window to compensate for variations of the angle of the window to allow the serving platform of the serving tray to be horizontal. The window abutting element is laterally positionable by slideably mounting it to the serving platform. The window abutting element is held in one of multiple positions by teeth formed on the serving platform and formed on the window abutting element. The window abutting element is biased towards the serving platform and is allowed to be moved away from the serving platform to separate the teeth of the window abutting element from the teeth of the serving platform.

It is thus an object of the present invention to provide a novel, improved serving tray.

It is further an object of the present invention to provide such a novel serving tray allowing the tray to be horizontal when removably attached to automobile windows.

It is further an object of the present invention to provide an improved window removably attaching device which is particularly adaptable for a serving tray of the type of U.S. Design Pat. No. 270,785 and which does not detract from its aesthetic and functional advantages.

It is further an object of the present invention to provide an improved window removably attaching device for a serving tray which is of a simple construction and which is easy to manufacture.

It is further an object of the present invention to provide an improved window removably attaching device for a serving tray which is of simple construction including few moveable parts.

It is further an object of the present invention to provide an improved window removably attaching device for a serving tray allowing adjustment while both hands of the car hop are holding the sides of the serving tray.

It is further an object of the present invention to provide an improved window removably attaching device for a serving tray which does not interfere with the stacking and nesting of the trays.

These and further objects and advantages of the present invention will become clearer in light of the following detailed description of an illustrative embodiment of this invention described in connection with the drawings.

BRIEF DESCRIPTION OF THE DRAWINGS

The illustrative embodiment may best be described by reference to the accompanying drawings where.

Figures 1, 2, 3, 4:
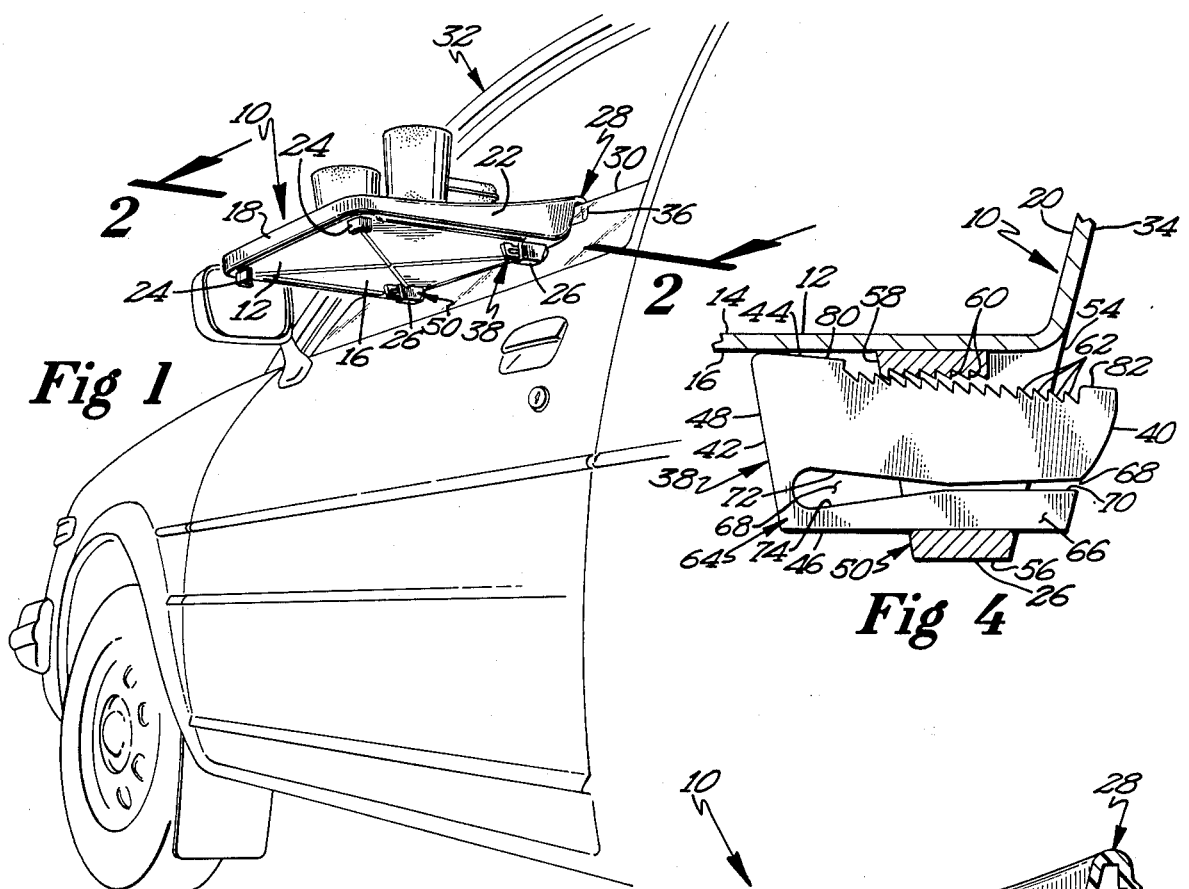
FIG. 1 shows a perspective view of an automobile serving tray according to the teachings of the preferred embodiment of the present invention removably attached to an automobile window.
FIG. 2 shows a cross sectional view of the automobile serving tray of FIG. 1 according to section line 2—2 of FIG. 1.
FIG. 3 shows a partial, exploded, cross sectional view of the automobile serving tray of FIG. 1.
FIG. 4 shows a partial, cross sectional view of the automobile serving tray of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms, "upper", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

An automobile serving tray according to the preferred embodiment of the teachings of the present invention is shown in the drawings and generally designated 10. In its most preferred form, tray 10 is an improvement of the automobile serving tray of the type shown in U.S. Design Pat. No. 270,785. Generally, tray 10 includes a serving platform 12 having an upper surface 14 and a bottom surface 16. Surface 14 of platform 12 is provided for receipt of items to be served to patrons located in the interior of the automobile. Tray 10 includes a front wall 18, a rear wall 20, and first and second side walls 22 extending therebetween and upwardly from surface 14 of platform 12 to prevent spills from the tray 10 and to give suspension-bridge strength to platform 12.

In its most preferred form, tray 10 includes a pair of front legs 24 and a pair of rear legs 26 extending downwardly from surface 16 and adjacent to the corners of platform 12. Legs 24 and 26 allow tray 10 to be supported on a horizontal surface such as a table or a counter and allow a plurality of trays 10 to be neatly stacked in a very compact manner.

Tray 10 further includes a device 28 for removably attaching the platform 12 to the window 30 of an automobile 32. In its most preferred form, removably attaching device 28 includes a window abutting portion 34 which extends at an angle to serving platform 12 of tray 10 and in its most preferred form extends at an angle in the range of 105° from the upper surface 14 of platform 12. In its most preferred form, window abutting portion 34 is formed by rear wall 20 and rear legs 26 of tray 10. Removably attaching device 28 further includes a window hook 36, and in its most preferred form, hook 36 is formed by a strut extending generally downwardly from the top edge of rear wall 20. In the preferred form, window hook 36 is notched in a manner as shown allowing the window hook 36 to engage the window at three different window positions to adjust the tray 10 to be horizontal for many car window angles.

Tray 10 according to the teachings of the present invention generally comprises an improved removably attaching device 38 and particularly comprises an adjustable window abutting edge 40 for abutting with window 30 in removably attaching device 28 to compensate for variations of the angle of window 30 to allow serving platform 12 of tray 10 to be horizontal when tray 10 is removably attached to window 30. In its most preferred form, edge 40 has a slight curvature in a direction perpendicular to platform 12.

In the preferred embodiment, device 38 generally includes a laterally adjustable element 42 shown in its most preferred form as a slide. Slide 42 generally includes a first, upper edge 44, a second, lower edge 46, a third, side edge 48 and a fourth, side edge shown in its most preferred form as window abutting edge 40. Device 38 further includes member 50 for selectively laterally positioning element 42 with respect to platform 12 in one of multiple positions. In the preferred embodiment, member 50 slideably mounts slide 42 to bottom surface 16 of platform 12 of tray 10. In its most preferred form, slideably mounting member 50 includes arms 54 extending from bottom surface 16 of platform 12 generally parallel to and spaced from legs 26 and connectors 56 extending between arms 54 and legs 26 generally parallel to and spaced from bottom surface 16 of platform 12. Thus, edges 44 and 46 of slide 42 are slideable on and between bottom surface 16 of platform 12 and connector 56, respectively.

In the preferred embodiment, selectively laterally positioning member 50 further includes member 58 for holding slide 42 in one of multiple positions. In its most preferred form, slide holding member 58 includes a plurality of teeth 60 formed on bottom surface 16 of platform 12 between legs 26 and arms 54, and a plurality of complementary teeth 62 formed in edge 44 of slide 42 intermediate edges 40 and 48. In its most preferred form, teeth 62 are generally parallel to but spaced from edge 44 a distance generally equal to the distance teeth 60 extend from surface 16 of platform 12. To allow selective engagement of teeth 62 of slide 42 with teeth 60 of platform 12, slideably mounting member 50 includes a member 64 for biasing slide 42 toward platform 12 allowing movement of teeth 62 away from teeth 60 against biasing member 64 to allow release of slide 42 from holding member 58 and its lateral positioning relative to platform 12.

In its most preferred form, biasing member 64 is integrally formed with slide 42 and generally is formed by a tongue 66 defined by a slot 68 extending from edge 40 generally parallel to and spaced from edges 44 and 46 to a point spaced from edge 48. In its most preferred form, slot 68 includes a first, generally straight surface 70 and a second, generally straight surface 72 which are parallel to each other and to edges 44 and 46, with surface 70 being intermediate surface 72 and edge 46. It can then be realized that the biasing of tongue 66 is created by the elasticity of the material of slide 42 located between the end of slot 68 and edge 48. In its most preferred form, surface 70 includes a depression 74 formed adjacent to the end of slot 68 and extending generally one third the distance of surface 70 towards edge 40 for decreasing the biasing force of tongue 66 of slide 42. Additionally, in its most preferred form, surface 72 includes a triangular shaped removed portion 76 extending from edge 40 to slightly over one half the distance towards the end of slot 68 and defining edge 78 on slide 42. In its most preferred form, the thickness of portion 76 at edge 40 is generally equal to the spacing of surfaces 70 and 72 and the angle between surfaces 70 and 72 and edge 78 is $6\frac{1}{2}°$.

It can then be appreciated that teeth 62 of slide 42 divides edge 44 into a first edge portion 80 adjacent to edge 48 and a second edge portion 82 adjacent to edge 40. In its most preferred form, portion 80 has a slightly greater height h above teeth 62 than portion 82. In its most preferred form, the corner between portion 82 of edge 44 and edge 40 is rounded.

In its most preferred form, edge 40 of slide 42 extends from edge 44 at an angle generally equal to the angle of window abutting portion 34 with surface 16 of platform 12 and particularly extends at an angle of 75°. In its most preferred form, slide 42 can be positioned such that edge 40 is generally coextensive with window abutting portion 34 in its first, lateral position. Thus, it can be appreciated that with slide 42 in its first, lateral position, tray 10 including device 38 of the present invention obtains all of the advantages of tray 10 without device 38. Particularly, for many automobiles, removeably attaching device 28 can be positioned on window 30 of automobile 32, with window 30 located in the notch of window hook 36 to abut with window abutting portion 34 such that platform 12 is horizontal. Furthermore, with slide 42 in its first, lateral position, multiple trays 10 can be stacked and nestled together without slides 42 of one tray 10 abutting with or interfering with the tray 10 upon which it is stacked.

However, for many automobiles, tray 10 cannot be positioned on window 30 utilizing removably attaching device 28 with platform 12 of tray 10 being horizontal. Removably attaching device 38 according to the teachings of the present invention can be utilized. Specifically, tray 10 can be manually positioned such that window 30 is located within window hook 36 and platform 12 of tray 10 is horizontal. At that time slide 42 can be slid within member 52 by pushing on edge 48 thereof such that teeth 62 of slide 42 ratchet on teeth 60 of platform 12 until edge 40 of slide 42 abuts with window 30. Tray 10 is then attached to window 30 and held in a horizontal position by window hook 36 and slide 42 of removably attaching device 38. Specifically, slide 42 is held in the lateral position where edge 40 of slide 42 engages and abuts with window 30 by teeth 62 of slide 42 engaging with teeth 60 of platform 12. Engagement of teeth 62 with teeth 60 is insured by biasing member 64. Furthermore, the torque force created by the weight of the food located on platform 12 of tray 10 on slide 42 also tends to push teeth 62 into teeth 60.

It should then be noted that device 38 does not clamp window 30 therein but rather tray 10 is positioned on window 10 such that the window 30 is located within removably attaching device 28 and specifically, is leveraged or fulcrumed into a horizontal position by edge 40 of slide 42 abutting with window 30. It can then be realized that it is only necessary to vertically raise tray 10 to remove tray 10 from window 30.

To allow stacking of trays 10 and to allow rapid deployment of tray 10 unto another style and type of automobile 32, when tray 10 is removed it is desirable to return slides 42 to their first, lateral position. Specifically, the fingers of carhop can be positioned on the corner between edges 40 and 44 and sufficient downward force is placed thereon to separate teeth 62 from teeth 60. With tooth separation, slide 42 can be slid in member 50 until slide 42 is in its first, lateral position with edge 40 generally coextensive with window abutting portion 34. Thus, the corner between edges 40 and 44 is rounded so as not to present a sharp edge for possibly cutting the finger of the carhop.

It can then be appreciated that removably attaching device 38 is of a particularly advantageous construction. It should be noted that the location of teeth 60 on bottom surface 16 of platform 12 and teeth 62 of slide 42 is advantageous over other locations. For example, the weight of the food located on platform 12 of tray 10 places a torque force on slide 42 which tends to push teeth 62 into teeth 60 as set forth hereinbefore. On the other hand, if teeth 60 and 62 were located on connector 56 and edge 46, this torque force would tend to separate the teeth and allow lateral movement of slide 42, and thus not hold platform 12 in a horizontal position.

Further, the lip defined by the portion between teeth 62 and edge 40 prevents accidental removal of slide 42 from member 50. Specifically, if only sufficient force is placed upon slide 42 to cant slide 42 against the biasing member 64 to dislodge teeth 62 from teeth 60, this lip will abut with the end of teeth 60 and prevent lateral movement therebeyond. In order to remove slide 42 from member 50, a sufficient force must be placed on slide 42 to position edge 78 parallel to surface 70 in a manner as seen in FIG. 4. It can then be appreciated that in this position, the height between surfaces 44 and 46 adjacent edge 40 is less than the spacing between teeth 60 and connector 56 and allow slide 42 to be pushed therethrough.

Additionally, it can be appreciated that slot 68 is of a particularly advantageous construction. Specifically, removed portion 76 allows the distance between surfaces 70 and 72 to be minimized with allowing the reduction of height along edge 40 to allow removal of slide 42 from member 50. The minimization of spacing of surfaces 70 and 72 insures that a sufficient biasing force exists to maintain contact between teeth 60 and 62, that sufficient material exists around slot 68 to prevent breakage of tongue 66 from slide 42, and that the two levels of force are created to prevent accidental removal of slide 42 from member 50.

Also, the curvature of edge 40 is further advantageous. Specifically, due to the various angles and shapes of windows 30 of the various types and models of automobiles 32, slide 42 will not abut with window 30 at the same point. The curvature of edge 40 allows slide 42 to abut window 30 with a tangent type relation as opposed to a corner type relation if edge 40 were a straight surface and the automobile window did not conform to such a straight surface. Furthermore, the curvature of edge 40 accentuates the tendency of the weight of food articles in tray 10 to push teeth 60 of slide 42 into teeth 62 of platform 12.

Similarly, the leg defined by the portion between teeth 62 and edge 48 of slide 42 is advantageous. Specifically, when slide 42 is canted relative to tongue 66 to separate teeth 62 from teeth 60 or to remove slide 42 from member 50, edge portion 80 of the leg abuts with bottom surface 16 of platform 12 to create a sliding lever arrangement where the leg forms a sliding fulcrum. The material of slide 42 around slot 68 according to the teachings of the present invention may thus be increased thereby increasing the prevention of breakage and proportionally increasing the biasing force of biasing member 64 while allowing ease of teeth separation by the carhop due to the force advantage gained by this leveraged relationship.

It can then be appreciated that the height of edge portion 80 above teeth 62 is important in insuring that teeth 62 contact and fully engage with teeth 60 and to allow ease of desirable teeth separation due to the sliding lever relationship. In its most preferred form, the height of edge portion 80 above teeth 62 is equal to the height of teeth 60 below bottom surface 16 of platform 12. In its most preferred form, the height of edge portion 82 above teeth 62 is less than the height of edge portion 80 above teeth 62 by a distance h to insure that the leg defined between teeth 62 and edge 40 does not abut with platform 12 and prevent full engagement of teeth 62 with teeth 60.

It can further be appreciated that the large number of teeth 60 provided, specifically in the range of seven teeth, reduces the wear per tooth by increasing the number of teeth 60 which simultaneously engage with teeth 62 of slide 42. Furthermore, the large number of teeth 60 prevent the accidental lateral movement of slide 42 since the large number allows separation of some of the teeth 60 without separating all of the teeth.

In its most preferred form, rear legs 26 have been moved closer to the sidewalls 22 than is shown in U.S. Design Pat. No. 270,785 to allow a carhop to hold tray 10 by gripping sidewalls 22 and to push slide 42 with her fingers. Furthermore, in its most preferred form, legs 24 and 26 have an increased height than is shown in U.S. Design Pat. No. 270,785 to allow ease of removal and separation of trays 10 from their stacked condition.

Now that the basic teachings of the present invention have been explained, many extensions and variations will be obvious to one having ordinary skill in the art. For example, although number 50 in its most preferred form is formed by and is a part of rear legs 26, member 50 can be separate from and independent from legs 26 according to the teachings of the present invention. Likewise, although members 50 are shown as extending from bottom surface 16 of platform 12, members 50 can extend from other locations such as the top surface 14 of platform 12. Similarly, although device 38 according to the teachings of the present invention has been described and is particularly adaptable to the automobile serving tray of the type shown in U.S. Design Pat. No. 270,785, device 38 according to the teachings of the present invention can be applied to serving trays of different types and configurations. Furthermore, although device 38 according the teachings of the present invention has been described in conjunction with removably attaching device 28, device 38 may be applied separately or with other types and/or constructions of window hooks.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In a serving tray for an automobile having a window with an outside surface and an upper edge, with the serving tray including a serving platform having an upper surface and a bottom surface, a front wall, a rear wall having a top edge, and first and second side walls extending between the front wall and the rear wall to give suspension bridge strength to the serving platform, first and second front legs extending from the bottom surface of the serving platform adjacent to the intersection of the front wall and the side walls, first and second rear legs extending from the bottom surface adjacent to the intersection of the rear wall and the side walls; a strut extending generally downwardly from the top edge of the rear wall forming an inverted V-shaped window hook, with the strut abutting with and supported by the upper edge of the window and with the rear wall forming a window abutting portion for abutting with and fulcrumming on the outside surface of the window, with the improvement comprising, in combination: a window abutting element having a window abutting edge; means for laterally positioning the window abutting element with respect to the serving platform allowing the window abutting edge to abut with and fulcrum on the outside surface of the window to compensate for variations of the angle of the window to allow the serving platform of the serving tray to be horizontal; with the laterally positioning means comprising, in combination: means for slideably mounting the window abutting element to the bottom surface of the serving platform comprising arms extending from the bottom surface of the serving platform generally parallel to and spaced from the rear legs and connectors extending between the arms and the rear legs generally parallel to the bottom surface of the serving platform; means for holding the window abutting element in one of multiple positions comprising: teeth formed on the bottom surface of the serving platform, teeth formed on the window abutting element complementary to and for interacting with the teeth of the serving platform, and means for biasing the window abutting element towards the bottom surface of the serving platform and for allowing movement of the teeth of the window abutting element to be separated from the teeth of the serving platform, with the biasing and movement allowing means comprising a tongue formed integrally with the window abutting element and formed by a slot extending between the tongue and the window abutting element, with the tongue being slideable along the connector of the slideably mounting means.

2. The serving tray of claim 1 wherein the window abutting element further comprises, in combination: a first, upper edge and a side edge, with the first, upper edge extending between the side edge and the window abutting edge, with the teeth of the window abutting element located in the first, upper edge, with the teeth being spaced from the side edge and defining a sliding fulcrum leg for sliding on the bottom surface of the serving platform for allowing ease of separation of the teeth of the window abutting element from the teeth of the serving platform for lateral adjustment of the window abutting element.

3. The serving tray of claim 2 wherein the teeth of the window abutting element are spaced from the window abutting edge defining a lip for abutting with the teeth of the bottom surface of the serving platform for preventing accidental removal of the window abutting element from the slideably mounting means.

4. The serving tray of claim 3 wherein the slot extends from the window abutting edge to a point spaced from the side edge of the window abutting element, with the lip of the window abutting element extending above the teeth to a height, with the spacing of the slot being generally less than the height of the lip, and with the window abutting element further comprising, in combination: a removed portion formed in the slot adjacent to the window abutting edge, with the removed portion allowing the window abutting element to be canted in the slideably mounting means sufficient to allow the lip of the window abutting element to pass under the teeth of the serving platform to allow removal of the window abutting element from the slideably mounting means.

5. The serving tray of claim 4 further comprising, in combination: a depression formed in the slot adjacent to the side edge of the window abutting element for decreasing the biasing force of the tongue.

6. The serving tray of claim 1 wherein the teeth of the window abutting element are spaced from the window abutting edge defining a lip for abutting with the teeth of the bottom surface of the serving platform for preventing accidental removal of the window abutting element from the slideably mounting means.

7. In a serving tray for an automobile having a window with an outside surface and an upper edge, with the serving tray including a serving platform having an upper surface and a bottom surface, a front wall, a rear wall having a top edge, and first and second side walls extending between the front wall and the rear wall to give suspension bridge strength to the serving platform, first and second front legs extending from the bottom surface of the serving platform adjacent to the intersection of the front wall and the side walls, first and second rear legs extending from the bottom surface adjacent to the intersection of the rear wall and the side walls; a strut extending generally downwardly from the top edge of the rear wall forming an inverted V-shaped window hook, with the strut abutting with and supported by the upper edge of the window and with the rear wall forming a window abutting portion for abutting with and fulcrumming on the outside surface of the window, with the improvement comprising, in combination: a window abutting element having a window abutting edge; means for laterally positioning the window abutting element with respect to the serving platform allowing the window abutting edge to abut with and fulcrum on the outside surface of the window to compensate for variations of the angle of the window to allow the serving platform of the serving tray to be horizontal; with the laterally positioning means comprising, in combination: means for slideably mounting the window abutting element to the serving platform; means for holding the window abutting element in one of multiple positions comprising: teeth formed on the serving platform, teeth formed on the window abutting element complementary to and for interacting with the teeth of the serving platform, and means for biasing the window abutting element towards the serving platform and for allowing movement of the teeth of the window abutting element to be separated from the teeth of the serving platform.

8. The serving tray of claim 7 wherein the window abutting element further comprises, in combination: a first, upper edge and a side edge, with the first, upper edge extending between the side edge and the window abutting edge, with the teeth of the window abutting element located in the first, upper edge, with the teeth being spaced from the side edge and defining a sliding fulcrum leg for sliding on the serving platform for allowing ease of separation of the teeth of the window abutting element from the teeth of the serving platform for lateral adjustment of the window abutting element.

9. The serving tray of claim 7 wherein the teeth of the window abutting element are spaced from the window abutting edge defining a lip for abutting with the teeth of the serving platform for preventing accidental removal of the window abutting element from the slideably mounting means.

10. The serving tray of claim 9 wherein the biasing and movement allowing means comprises, in combination: a tongue formed integrally with the window abutting element and formed by a slot extending between the tongue and the window abutting element; wherein the window abutting element further comprises, in combination: a first, upper edge and a side edge, with the first, upper edge extending between the side edge and the window abutting edge, with the teeth of the window abutting element located in the first, upper edge; wherein the slot extends from the window abutting edge to a point spaced from the side edge of the window abutting element, with the lip of the window abutting element extending above the teeth to a height, with the spacing of the slot being generally less than the height of the lip, and with the window abutting element further comprising, in combination: a removed portion formed in the slot adjacent to the window abutting edge, with the removed portion allowing the window abutting element to be canted in the slideably mounting means sufficient to allow the lip of the window abutting element to pass under the teeth of the serving platform to allow removal of the window abutting element from the slideably mounting means.

11. The serving tray of claim 10 further comprising, in combination: a depression formed in the slot adjacent to the side edge of the window abutting element for decreasing the biasing force of the tongue.

12. The serving tray of claim 10 wherein the slideably mounting means comprises, in combination: arms extending from the bottom surface of the serving platform generally parallel to and spaced from the rear legs and connectors extending between the arms and the rear legs generally parallel to the bottom surface of the serving platform, with the tongue being slideable along the connector of the slideably mounting means.

13. In a serving tray for an automobile having a window with an outside surface and an upper edge, with the serving tray including a serving platform having an upper surface and a window hook for abutting with and support on the upper edge of the window, with the improvement comprising, in combination: a window abutting element having a window abutting edge; means for laterally positioning the window abutting element with respect to the serving platform allowing the window abutting edge to abut with and fulcrum on the outside surface of the window to compensate for variations of the angle of the window to allow the serving platform of the serving tray to be horizontal; with the laterally positioning means comprising, in combination: means for slideably mounting the window abutting element to the serving platform; means for holding the window abutting element in one of multiple positions comprising: teeth formed on the serving platform, teeth formed on the window abutting element complementary to and for interacting with the teeth of the serving platform; and means for biasing the window abutting element towards the serving platform and for allowing movement of the teeth of the window abutting element to be separated from the teeth of the serving platform.

14. The serving tray of claim 13 wherein the window abutting element further comprises, in combination: a first, upper edge and a side edge, with the first, upper edge extending between the side edge and the window abutting edge, with the teeth of the window abutting element located in the first, upper edge, with the teeth being spaced from the side edge and defining a sliding fulcrum leg for sliding on the serving platform for allowing ease of separation of the teeth of the window abutting element from the teeth of the serving platform for lateral adjustment of the window abutting element.

15. The serving tray of claim 13 wherein the teeth of the window abutting element are spaced from the window abutting edge defining a lip for abutting with the teeth of the serving platform for preventing accidental removal of the window abutting element from the slideably mounting means.

16. The serving tray of claim 15 wherein the biasing and movement allowing means comprises, in combination: a tongue formed integrally with the window abutting element and formed by a slot extending between the tongue and the window abutting element; wherein the window abutting element further comprises, in combination: a first, toothed edge and a side edge, with the first, toothed edge extending between the side edge and the window abutting edge, with the teeth of the window abutting element located in the first, toothed edge; wherein the slot extends from the window abutting edge to a point spaced from the side edge of the window abutting element, with the lip of the window abutting element extending above the teeth to a height, with the spacing of the slot being generally less than the height of the lip, and with the window abutting element further comprising, in combination: a removed portion formed in the slot adjacent to the window abutting edge, with the removed portion allowing the window abutting element to be canted in the slideably mounting means sufficient to allow the lip of the window abutting element to pass under the teeth of the serving platform to allow removal of the window abutting element from the slideably mounting means.

17. The serving tray of claim 16 further comprising, in combination: a depression formed in the slot adjacent to the side edge of the window abutting element for decreasing the biasing force of the tongue.

18. The serving tray of claim 16 wherein the serving platform has a bottom surface; wherein the serving tray further includes first and second front legs and first and second rear legs extending from the bottom surface of the serving platform; and wherein the slideably mounting means comprises, in combination: arms extending from the bottom surface of the serving platform generally parallel to and spaced from the rear legs and connectors extending between the arms and the rear legs generally parallel to the bottom surface of the serving platform, with the tongue being slideable along the connector of the slideably mounting means.

19. The serving tray of claim 18 wherein the angle between the first, toothed edge and the window abutting edge is less than 90° for causing the products placed on the serving platform to create a torque force on the window abutting element which tends to push the teeth of the window abutting element into the teeth of the serving platform.

20. The serving tray of claim 16 wherein the corner between the first, toothed edge and the window abutting edge is rounded so as not to present a sharp edge.

* * * * *